(12) United States Patent
Christianson et al.

(10) Patent No.: US 8,539,101 B2
(45) Date of Patent: Sep. 17, 2013

(54) SYSTEMS, METHODS, AND COMPUTER PROGRAMS FOR DETECTING CARRIER-CONTROLLED REQUESTS FOR A WEB SITE

(75) Inventors: Ryan D. Christianson, Seattle, WA (US); John A. Kehle, Kirkland, WA (US)

(73) Assignee: Disney Enterprises, Inc., Burbank, CA (US)

( * ) Notice: Subject to any disclaimer, the term of this patent is extended or adjusted under 35 U.S.C. 154(b) by 61 days.

(21) Appl. No.: 13/232,239

(22) Filed: Sep. 14, 2011

(65) Prior Publication Data

US 2012/0042008 A1 Feb. 16, 2012

Related U.S. Application Data

(63) Continuation-in-part of application No. 12/189,844, filed on Aug. 12, 2008, now Pat. No. 8,028,089.

(51) Int. Cl.
*G06F 15/173* (2006.01)

(52) U.S. Cl.
USPC ........ 709/238; 709/203; 705/14.69; 705/14.4

(58) Field of Classification Search
None
See application file for complete search history.

(56) References Cited

U.S. PATENT DOCUMENTS

| | | | |
|---|---|---|---|
| 6,754,833 B1* | 6/2004 | Black et al. | 726/7 |
| 2008/0160970 A1* | 7/2008 | Srinivas Reddy et al. | 455/414.1 |
| 2008/0207182 A1* | 8/2008 | Maharajh et al. | 455/414.1 |
| 2008/0300967 A1* | 12/2008 | Buckley et al. | 705/10 |

* cited by examiner

*Primary Examiner* — Ario Etienne
*Assistant Examiner* — Clayton R Williams
(74) *Attorney, Agent, or Firm* — Patterson & Sheridan, LLP

(57) ABSTRACT

Various embodiments of systems, methods, and computers are disclosed for detecting and/or managing carrier-controlled requests for a web site. One embodiment is a method system for providing a web site to mobile communication devices. The system comprises a mobile communication device and a server. The mobile communication device is configured to communicate with the server via a communication network and comprises a carrier-controlled user interface for accessing a web site. The server is configured to provide the web site to the mobile communication device and comprises an on-deck detection system and an on-deck/off-deck management system embodied in a memory and executed by a processor. The on-deck detection system detects requests for the web site from the carrier-controlled user interface, and the on-deck/off-deck management system manages the requests.

15 Claims, 12 Drawing Sheets

SYSTEMS, METHODS, AND COMPUTER PROGRAMS FOR DETECTING CARRIER-CONTROLLED REQUESTS FOR A WEB SITE

CROSS-REFERENCE TO RELATED APPLICATIONS

This application is a continuation-in-part patent application of U.S. patent application Ser. No. 12/189,844 filed on Aug. 12, 2008 now U.S. Pat. No. 8,028,089 and entitled "On-Deck Detection for a Web Site," which is hereby incorporated by reference in its entirety.

BACKGROUND

The convergence of computing and communications technologies is making it possible for mobile communication devices to access information nearly anywhere and anytime. The technologies supporting wide area wireless networking and mobile telephony, for example, are in the process of merging to provide an infrastructure that offers nearly ubiquitous on-line access. These technologies enable mobile communication devices (e.g., mobile phones, personal digital assistants, notebook computers, laptops, etc.) to access applications or any form of digital content on the Internet via a mobile communication network.

A typical mobile communication device interfaces with a carrier network that provides mobile data communications, in addition to traditional voice services. For data communications, the carrier network may include a carrier server that provides an interface to sources on the Internet (e.g., web servers). The web servers may provide any combination of content and/or functionality via suitable protocols for mobile communication.

There are a number of user interface mechanisms and methods for enabling a user of the mobile communication device to access the content and/or functionality on a web server. For example, many mobile communication devices include a browser that enables the user to enter a target address (e.g., a uniform resource locator (URL) or other address scheme supported by the underlying protocols) identifying where the content is located on the Internet. For some types of mobile communication devices and for some users, this may be problematic due to the limited size of the supporting display and the limitations of the user input mechanisms (e.g., soft keys, hard keys, voice commands, gestures, etc.). Within the browser, there are other typical ways to access the content. Web pages may be accessed via search engine results or as links embedded within other software on the mobile communication device. Users may also bookmark web pages for easy access at a later time without having to retype the target address.

It has become increasingly common for the mobile carriers supporting the carrier network to provide the mobile communication devices to users with a pre-configured menu for accessing certain resources on the Internet. The pre-configured menu installed on devices provided by the mobile carrier is referred to as an "on-deck" menu or a "carrier deck". A typical on-deck menu includes links to on-line resources that may be desirable to the carrier's subscribers, such as common content providers, web portals, social networking sites, or other sites offering desirable information or functionality. Mobile carriers leverage these on-deck menus by offering this "space" to content providers. The mobile carrier and the content provider typically enter into a mutually-beneficial arrangement whereby the content provider is placed on the carrier deck and the mobile carrier receives some return benefit (e.g., direct compensation, a share of advertising revenues from the web site, etc.). Because the mobile carrier can present the on-deck menu to subscribers in a user-friendly, convenient, and conspicuous manner, on-deck menus are viewed by content providers as a potentially desirable and cost-effective means for driving users to their web sites.

Within this framework, two general business models have emerged for content providers: the on-deck model and the off-deck model. These business models refer to the ways in which content providers choose to direct users to their web sites. As mentioned above, in the on-deck model, users are directed to web sites from the carrier deck. In the on-deck business model, the content providers must secure a deal with the mobile carriers. While this model offers immediate access to the carrier's subscriber base, it often comes at the cost of sharing advertising revenue with the carrier. The content provider may generate revenue by selling advertising space on the web site. Advertising on web sites may be purchased based on certain types of user activities (e.g., click-throughs, sales, etc.) or merely based on user impressions. Whichever model is employed, for a web site to properly account for on-deck advertising revenues, it is desirable for the content provider to detect and differentiate between users visiting the web site from the carrier deck and users visiting the web site via some other method.

Thus, there is a need in the industry for improved systems, methods, and computer software for detecting and/or managing on-deck and off-deck users for a web site.

SUMMARY

Various embodiments of systems, methods, and computer programs are disclosed for providing a web site to a mobile communication device. One embodiment is a method comprising: a carrier controlling a presentation of a user interface on a mobile communication device for enabling a user to access a web site of an associated content provider; a server receiving a first request for the web site from the mobile communication device; the server determining that the first request originated from the carrier-controlled user interface; in response to the server determining that the first request originated from the carrier-controlled user interface, the server presenting the web site to the mobile communication device in a first browsing session consistent with terms of a relationship between the carrier and the associated content provider; after the first browsing session, the server receiving a second request for the web site from the mobile communication device; the server determining that the second request originated from a source other than the carrier-controlled user interface on the mobile communication device; and in response to the server determining that the second request originated from the source other than the carrier-controlled user interface, the server presenting the web site to the mobile communication device in a second browsing session without regard to the terms of the relationship between the carrier and the associated content provider.

Another embodiment is a system for providing a web site to mobile communication devices. The system comprises a mobile communication device and a server. The mobile communication device is configured to communicate with the server via a communication network. The mobile communication device comprises a carrier-controlled user interface for accessing the web site. The server is configured to provide the web site to the mobile communication device and comprises an on-deck detection system and an on-deck/off-deck management system embodied in a memory and executed by a processor. The on-deck detection system and the on-deck/off-deck management system comprise logic configured to: receive a first request for the web site from the mobile communication device; determine that the first request originated from the carrier-controlled user interface on the mobile communication device; in response to determining that the first request originated from the carrier-controlled user interface, present the web site to the mobile communication device in a first browsing session with a first presentation scheme associated with a carrier; receive, after the first browsing session, a second request for the web site from the mobile communication device; determine that the second request originated from a source other than the carrier-controlled user interface on the mobile communication device; and in response to determining that the second request originated from the source other than the carrier-controlled user interface, present the web site to the mobile communication device in a second browsing session with a different presentation scheme.

Yet another embodiment is computer program embodied in a non-transitory computer-readable medium for managing on-deck and off-deck users of a web site. The computer program comprises: logic configured to receive, in a first browsing session, a first request for a web site from a mobile communication device; logic configured to determine that the first request originated from a carrier-controlled user interface on the mobile communication device; logic configured to, if the first request originated from the carrier-controlled user interface, present the web site as an on-deck browsing session; logic configured to receive, in a second browsing session occurring after the first browsing session, a second request for the web site from the mobile communication device, the second request initiated from a source other than the carrier-controlled user interface; and logic configured to enforce the second browsing session as an on-deck browsing session despite being initiated from the source other than the carrier-controlled user interface.

DETAILED DESCRIPTION

Various embodiments of systems, methods, and computer software for detecting on-deck and off-deck users of a web site are provided. The terms "on-deck" and "off-deck" are made with reference to a carrier deck on a mobile communication device. The term "on-deck" refers to a user or session that originated on or via a carrier deck, and the term "off-deck" refers to a user or transaction that did not originate on or via a carrier deck. A carrier deck comprises a menu or any other user interface mechanism presented on or with a mobile communication device that is controlled in whole or in part by the mobile carrier (referred to as a "carrier-controlled user interface"). In an embodiment, the carrier deck may comprise any selection of on-line resources provided by the mobile carrier on subscriber devices. The on-line resources may be provided by content providers, application providers, or other on-line entities affiliated with the mobile carrier. The on-line resources may comprise, for example, links or other mechanisms for accessing information, applications, services, or functionality via the Internet. The carrier deck may be located or presented on any suitable mobile communication device that is configured to communicate via the carrier's network and interface with the Internet via suitable protocols.

It should be appreciated that the mobile communication device may comprise a mobile phone, a smart phone, a personal digital assistant, a notebook or laptop, a tablet computer, or any other portable computing device or non-portable computing device that supports communication over a mobile carrier network and/or a wireless connection to the Internet. The particular supporting mobile and other communication protocols are not relevant to the particular embodiments described, and as such any communication protocol(s) may be used. It should be appreciated that the systems, methods, and computer software for detecting and/or managing on-deck and off-deck users may be implemented via any suitable carrier network and/or the Internet and any web site. Furthermore, the particular configuration of the carrier deck is not relevant. Rather, it should be appreciated that the carrier deck refers to any suitable user interface mechanism selected, directed, and/or controlled by a mobile carrier for placement or presentation on subscribers' mobile communication devices. A carrier deck may be pre-installed on a mobile communication device provided by the mobile carrier or subsequently downloaded to the mobile communication device.

Figure 1:
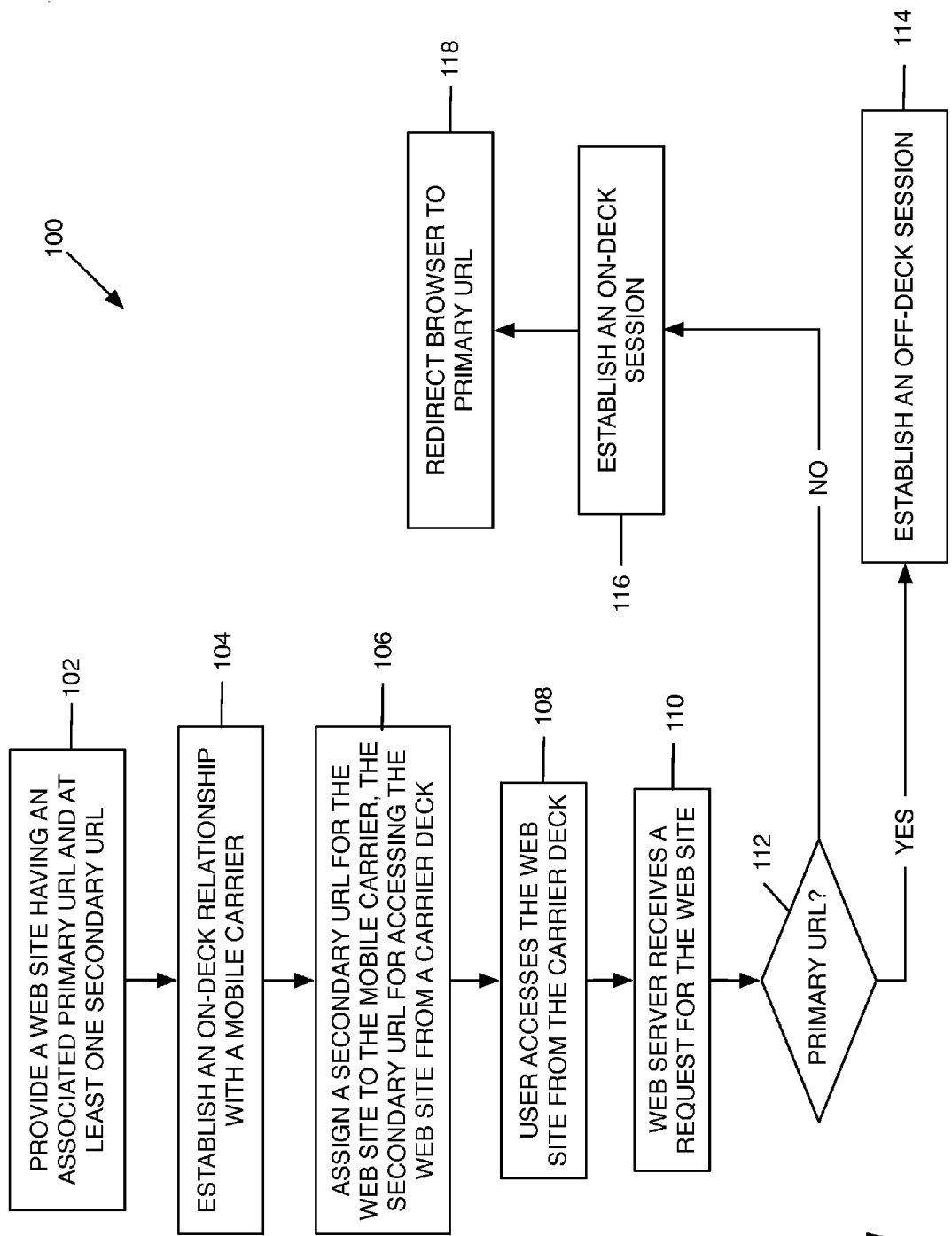
FIG. 1 is a flow chart illustrating one of a number of possible embodiments of a method for detecting on-deck users for a web site.

FIG. 1 illustrates an exemplary method 100 for detecting an on-deck user of a web site. At block 102, a web site is provided having an associated primary URL and at least one secondary URL. The web site may support any suitable content and/or functionality. In one of a number of possible embodiments, the web site is specifically designed for access by mobile communication devices. The mobile web site may support, for example, any suitable protocols or standards for wireless communication, including, but not limited to, wireless application protocol (WAP), wireless markup language (WML), WAP datagram protocol (WDP), and XHTML. The primary URL may be used as a general point of access to the web site from any source other than a carrier deck. For example, the primary URL may be used for accessing the web site from a browser, within search engine results, and any other entry point other than on or from a carrier deck. The provider of the web site may advertise the primary URL. A secondary URL(s) may be reserved for assignment to a mobile carrier for use on their carrier deck. While the term URL is used (referring to a uniform resource locator used in connection with certain known web-based protocols), it should be appreciated that alternative addressing schemes may be implemented. The relevant aspect is that the web site associates an address or entry point to the web site for off-deck access and one or more secondary addresses or entry points for on-deck access.

At block 104, the provider of the web site establishes an on-deck relationship with one or more mobile carriers. The on-deck relationship may take any suitable legal or business form that has the effect of the mobile carrier providing access to the web site on or from their carrier deck. The on-deck relationship may involve the provider of the web site providing any benefit to the mobile carrier, including, for example, providing direct compensation or sharing advertising revenues associated with the web site. At block 106, the provider of the web site assigns a secondary URL or alternative URL to the mobile carrier with whom an on-deck deal was established. When configuring the carrier deck, the secondary URL is used for providing access to the web site. At block 108, a user of a mobile communication device on the carrier network (or other connection to the web site, such as, for example, via a wireless access point) accesses the web site from the carrier deck. As mentioned above, this may involve interacting with any suitable carrier-controlled user interface mechanism. In one embodiment, the user may access a conspicuous menu on the mobile communication device and select a link associated with the secondary URL. The mobile communication device sends a request for the secondary URL to a web server hosting the web site. As described below in more detail with reference to FIGS. 7-12, in other embodiments the carrier-controlled user interface may comprise, for example, an electronic "app" store (including associated user interface mechanisms, menus, etc.) that enables subscribers to search, browse, view, download, and/or interact with third party applications, games, books, magazines, newspapers, or other content via the mobile communication device. Any of these carrier-controlled user interface mechanisms may include the selectable link associated with the secondary URL.

At block 110, the web server receives the request and, at decision block 112, determines whether the request is for the primary URL. If the request is for the primary URL, at block 114, the web server establishes an off-deck session with the mobile communication device. During the off-deck session, the user is treated as an off-deck user. If the request is not for the primary URL (e.g., the request is for a secondary URL), the web server establishes an on-deck session (block 116) and may redirect the mobile communication device to the primary URL (block 118), remain on the secondary URL, or redirect to any other URL. During the on-deck session, the user is treated as an on-deck user. As described in more detail below, the on-deck user may be identified as originating from the mobile carrier. For example, the web server may employ a database that associates the secondary URL with the corresponding mobile carrier. When a request for the secondary URL is received, the web server can determine the mobile carrier. With knowledge of the particular mobile carrier, the on-deck session may be designed in accordance with pre-defined arrangements with the mobile carrier. In one embodiment, the on-deck session is branded according to the identity of the mobile carrier.

Figure 2:
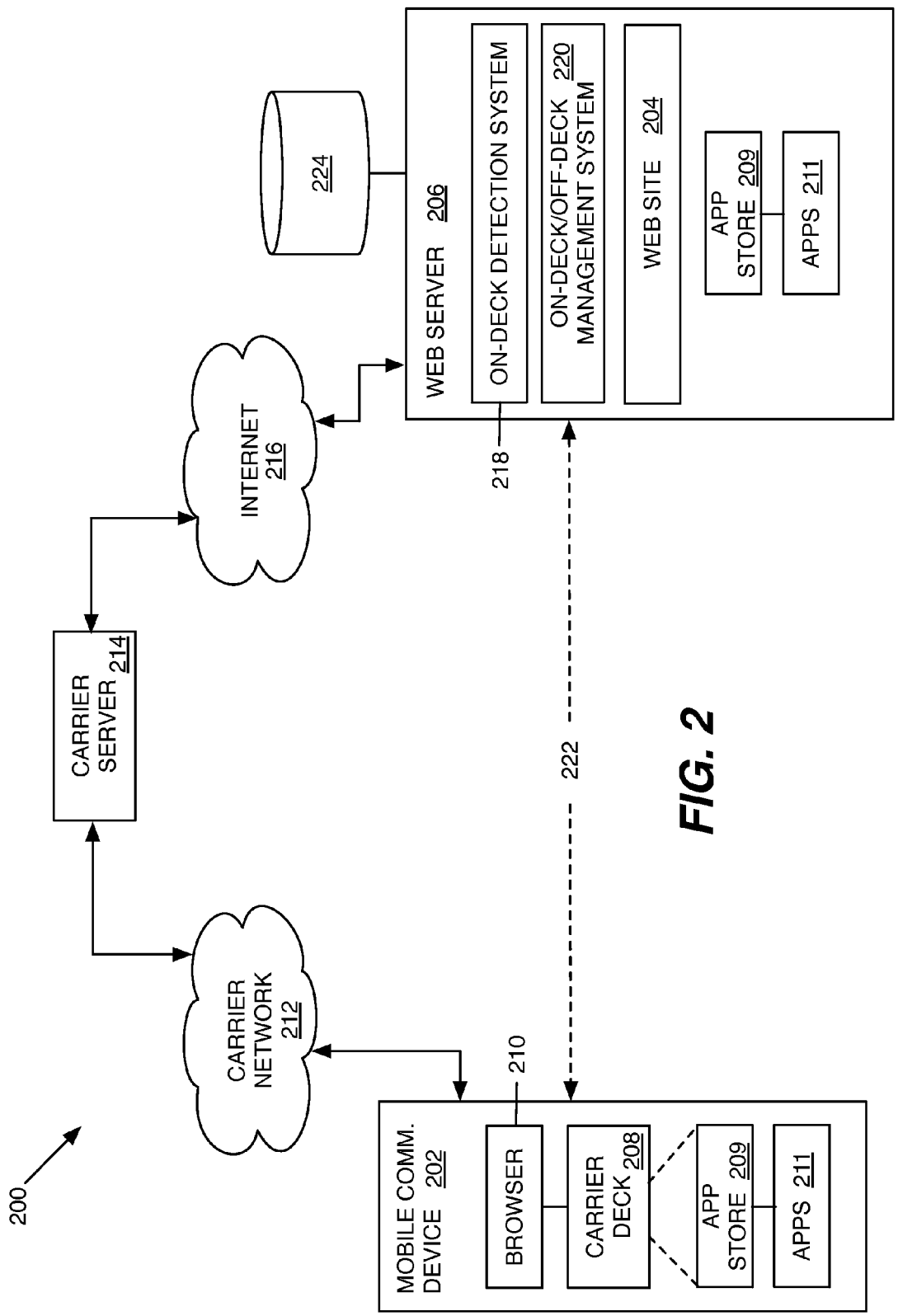
FIG. 2 is a block diagram illustrating one of a number of possible embodiments of system for detecting on-deck users for a web site.

FIG. 2 generally illustrates a system 200 for implementing various additional embodiments of systems, methods, and computer software for detecting and/or managing on-deck and off-deck users for a web site. The system 200 enables a mobile communication device 202 to access a web site 204 hosted on a web server 206. The mobile communication device 202 comprises a carrier-controlled user interface (e.g., carrier deck 208) and a browser 210. The carrier deck 208 comprises a carrier-controlled user interface mechanism as described above for enabling a user of the mobile communication device 202 to access on-line resources defined and/or provided by a mobile carrier. The carrier deck 208 enables a user to access the web site 204. The carrier deck 208 or other carrier-controlled user interface may be associated with, for example, an electronic "app" store 209 (and/or any other or associated user interface mechanisms, menus, etc.) that enables subscribers to search, browse, view, download, and/or interact with third party applications, games, books, or other content (referred to as "apps" 211) via the mobile communication device 202. The browser 210 may provide an alternative means for accessing the web site 204. As illustrated in FIG. 2, the mobile communication device 202 communicates with the mobile carrier's network (carrier network 212) or, in other embodiments, directly communicates with the Internet 216 via a suitable connection without connecting to the carrier server 214. The carrier network 212 may provide voice and data communication services to the mobile communication devices 202. To facilitate data communications, the mobile carrier may provide a carrier server 214 which functions as an interface to wide area data networks (e.g., Internet 216). The carrier server 214 enables the mobile communication device 202 to interface with web servers via Internet 216. As known in the art, the mobile communication device 202 and the web server 206 communicate via a logical connection 222 over the carrier network 212 and/or the Internet 216.

The web server 206 hosts the web site 204 and further comprises an on-deck detection system 218 and an on-deck/off-deck management system 220. In general and as described in more detail below, the on-deck detection system 218 comprises the logic and/or functionality for detecting when the mobile communication device 202 accesses the web site 204 via the carrier deck 208. The on-deck/off-deck management system 220 comprises the logic and/or functionality for managing the presentation of the web site 204 to on-deck users and off-deck users. After detecting whether a user is an on-deck user (i.e., accessing the web site 204 via the carrier deck 208) or an off-deck user (i.e., otherwise accessing the web site 204), the web site 204 may be presented differently to on-deck and off-deck users. The on-deck/off-deck management system 220 controls the presentation scheme based on on-deck versus off-deck users. Furthermore, it should be appreciated that the on-deck/off-deck management system 220 may enable a content provider to intercept and convert an initial on-deck session into a subsequent off-deck session. For example, in the initial on-deck session, the content provider may present the web site 204 to the user in a manner consistent with terms of the relationship between the carrier and the content provider. It may be advantageous, however, for the content provider to convert the on-deck user into an off-deck user (via the on-deck/off-deck management system 220) so that subsequent requests for the web site 204 are not subject to the terms, including, for example, revenue sharing requirements, promotional fees, advertising costs, business costs, or otherwise improve desirable web analytics for the content provider.

Figure 3:
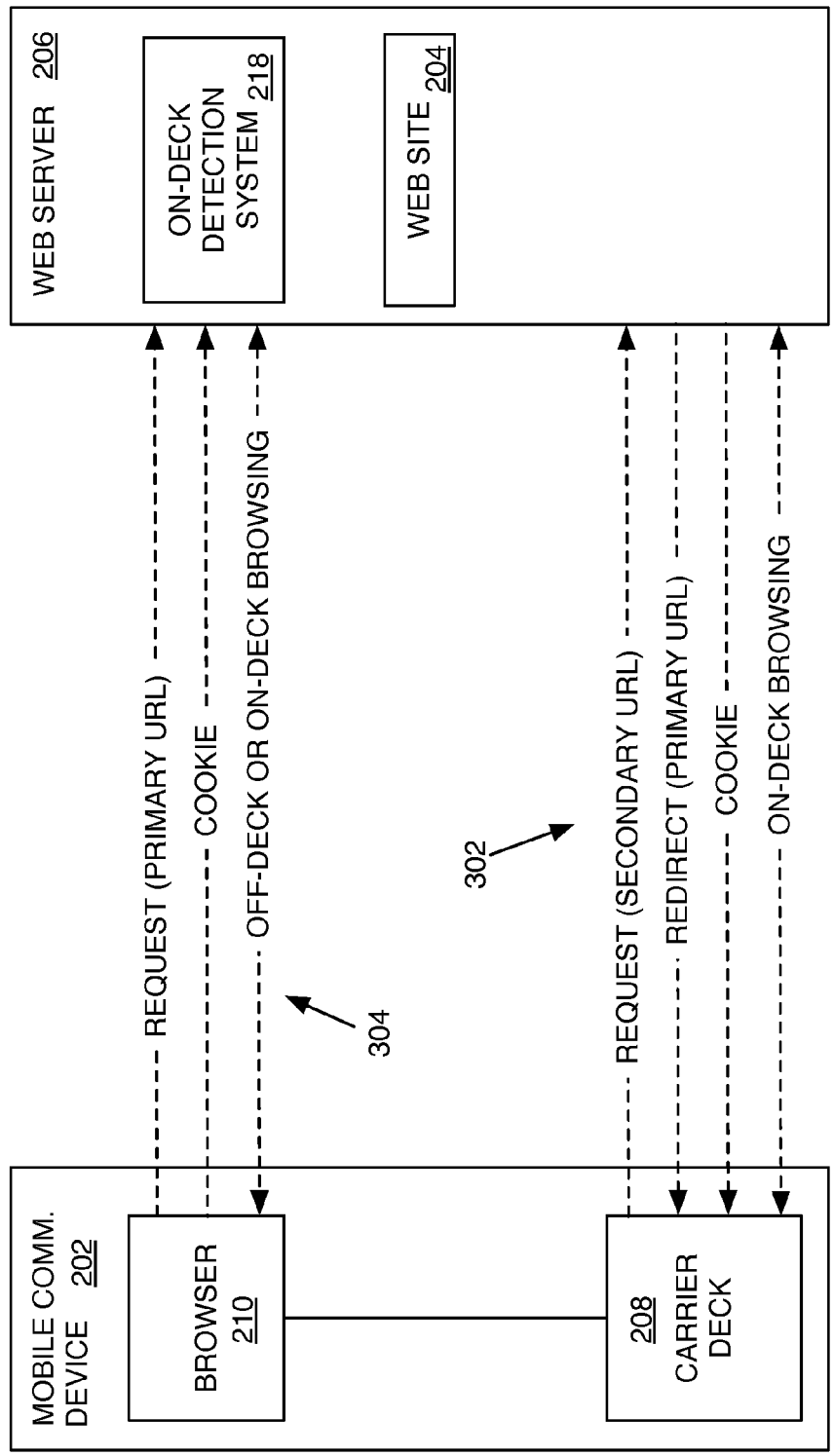
FIG. 3 is a combined block/flow diagram illustrating the operation and/or functionality of the system of FIG. 2.

FIG. 3 illustrates one of a number of possible embodiments of a method for detecting and managing an on-deck user for the web site 204. The method is described with reference to the communication between the mobile communication device 202 and web server 206 via the logical interface 222. It should be appreciated that the functions described in connection with this method may be implemented using any suitable communication protocols. As illustrated in FIG. 3, a first portion of the method occurs via a first browsing session (reference numeral 302), and a second portion of the method occurs via a second browsing session (reference numeral 304).

Referring to the first session 302, a user accesses the carrier-controlled user interface (e.g., carrier deck 208, app store 209, apps 211, etc.) and requests the web site 204. The initial request from the carrier deck 208 involves a secondary URL. As mentioned above, the web site 204 may have an associated primary URL for off-deck users and at least one secondary URL for on-deck users. The web server 206 receives the request for the secondary URL and may redirect the device to the primary URL or another URL or stay at the secondary URL. The web server 206 may also set a cookie (not shown) that is stored on the mobile communication device 202. When the mobile communication device 202 is redirected to the primary URL, the information in the cookie may be used by the web server 206 to identify the device as a redirected on-deck user. Having identified the user as an on-deck user, the web server 206 provides an on-deck browsing experience consistent with the terms of the relationship with the carrier. The particular features of the on-deck browsing experience may be provided on a carrier-specific basis via the on-deck/off-deck management system 220 (FIG. 2).

Figure 4:
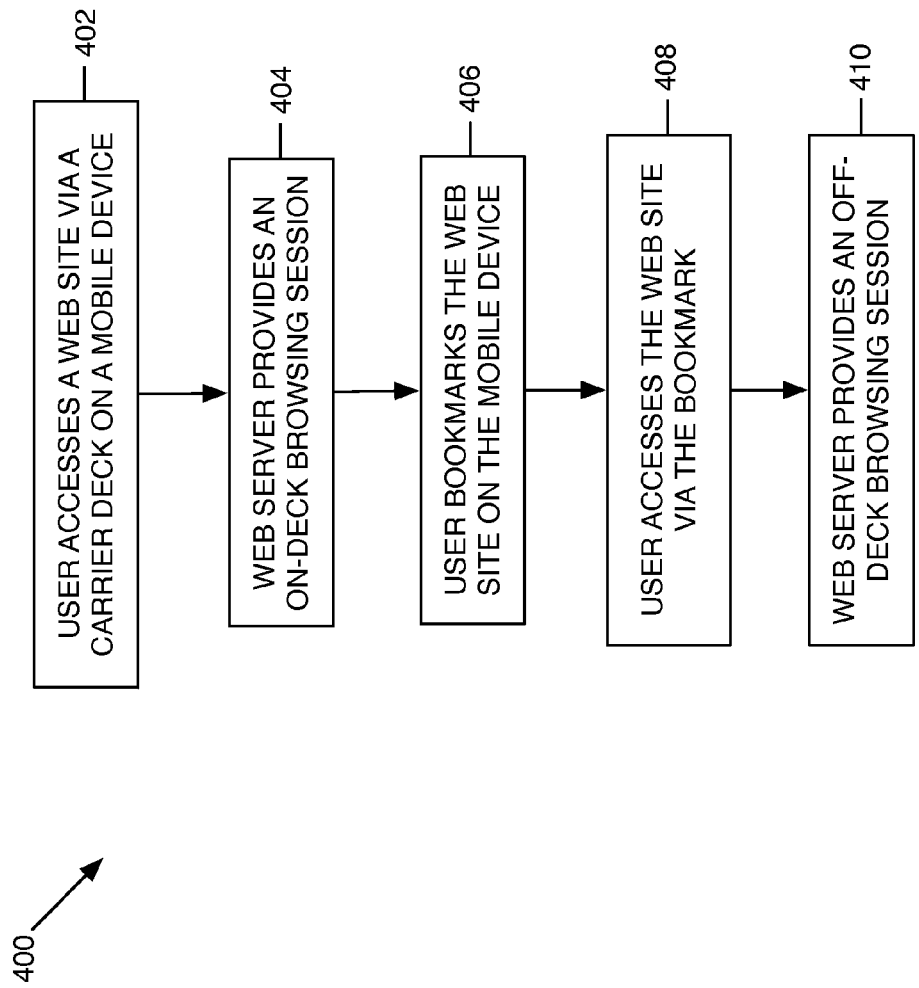
FIG. 4 is a flow chart illustrating an embodiment of a method for managing on-deck/off-deck users for a web site.

The user of the mobile communication device 202 may decide to return to the web site 204 at a later time. In the subsequent browsing session, the user may not access the web site 204 via the carrier deck 208. Instead, the user may, for example, input the primary URL in the browser 210, select the primary URL from a search engine results page (SERP), or otherwise select the primary URL off of the carrier deck 208. A request for the primary URL is sent to the web server 206. The cookie previously set by the web server 206 and stored on the mobile communication device 202 may also be sent to the web server 206. The information in the cookie may indicate that the device previously accessed the web site 204 via the carrier deck 208. Based on predefined business rules stored in a database 224 (FIG. 2) and associated logic, the web server 206 may decide whether the subsequent browsing session (which was initiated off-deck) should be or should not enforced as an on-deck browsing session. Depending on the specifics of the on-deck relationship with the mobile carrier, it may be desirable or necessary to enforce subsequent off-deck requests as on-deck sessions. Having identified the previous on-deck request (and perhaps the identity of the carrier) based on the information in the cookie, the web server 206 may flexibly provide either an off-deck or an on-deck browsing session and, where appropriate, may selectively capture the user as an off-deck lead to circumvent, for example, revenue sharing requirements, promotional fees, advertising costs, business costs, or otherwise improve desirable web analytics for the content provider FIG. 4 illustrates an embodiment of a method for detecting and managing on-deck and off-deck users for a web site. The method supports the detection and management of on-deck users across multiple browsing sessions. At block 402, a user accesses a web site via a carrier-controlled user interface on a mobile communication device 202. At block 404, the web server 206 provides an on-deck browsing session. At block 406, the user bookmarks the web site. The bookmark may comprise an alternative URL designated by the content provider for off-deck users and configured or controlled by the web server 206. In a subsequent browsing session, at block 408, the user accesses the alternative URL via the bookmark. At block 410, the web server 206 provides an off-deck browsing session to the users. As described above, it should be appreciated that it may be advantageous for the purveyor of the web site 204 to treat subsequent visits to the web site as off-deck. This method provides a convenient mechanism for detecting web site visits launched from the carrier-controlled user interface, diverting subsequent visits, and treating them as off-deck sessions.

Referring again to web server 206 (FIGS. 2 and 3), one of ordinary skill in the art will appreciate that the on-deck detection system 218 (and the on-deck/off-deck management system 220) may be implemented in software, hardware, firmware, or a combination thereof. In one embodiment, the systems are implemented in software or firmware that is stored in a memory and that is executed by a suitable instruction execution system. In software or firmware embodiments, the logic may be written in any suitable computer language. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
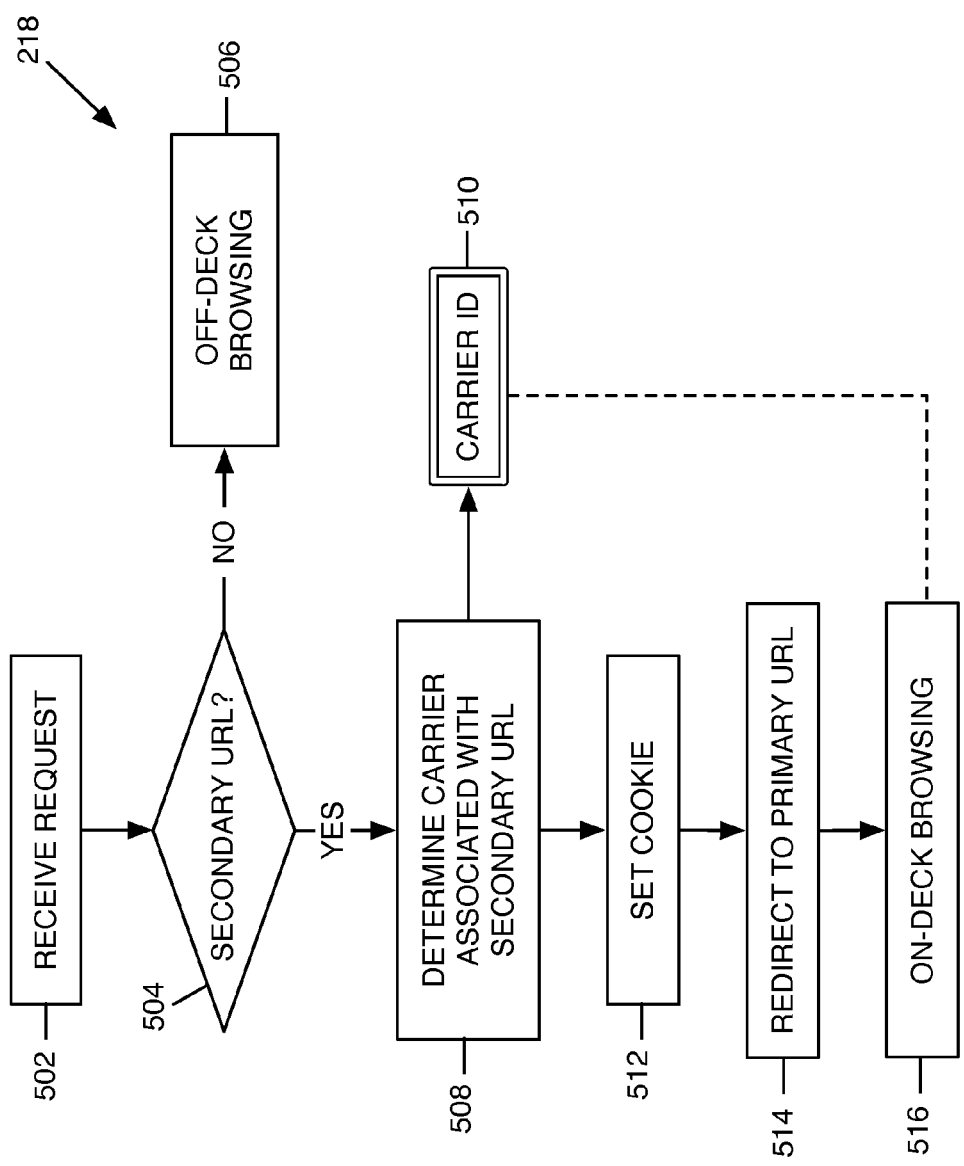
FIG. 5 is a flow chart illustrating the architecture, operation, and/or functionality of an exemplary embodiment of the on-deck detection system of FIG. 2.

FIG. 5 illustrates the architecture, operation, and/or functionality of an implementation of the on-deck detection system 218. At block 502, the on-deck detection system 218 receives a request for the web site 204 and, at decision block 504, determines whether the request is for the secondary URL associated with the carrier deck 208. If the request involves the primary URL, at block 506, the on-deck detection system 218 initiates an off-deck browsing session. If the request involves the secondary URL, at block 508, the on-deck detection system 218 may determine the mobile carrier associated with the secondary URL, and may provide an on-deck browsing session. In this regard, the web server 206 may comprise a database 224 (or interface with a remote database) which maintains a mapping of secondary URLs to corresponding mobile carriers. At block 512, the on-deck detection system 218 may set a cookie with information corresponding to the mobile carrier and/or information indicating the device has accessed the web site 204 via the carrier deck 208. At block 514, the on-deck detection system 218 may redirect the device to the primary URL or an alternate URL or stay at the secondary URL. When the device accesses the primary URL, the on-deck detection system 218 determines based on the information in the cookie, or other information, that the user should be treated as an on-deck user (block 516). The cookie may also include information about the identity of the mobile carrier (e.g., a carrier ID 510). In these embodiments, the on-deck browsing session may be managed according to the mobile carrier.

Figure 6:
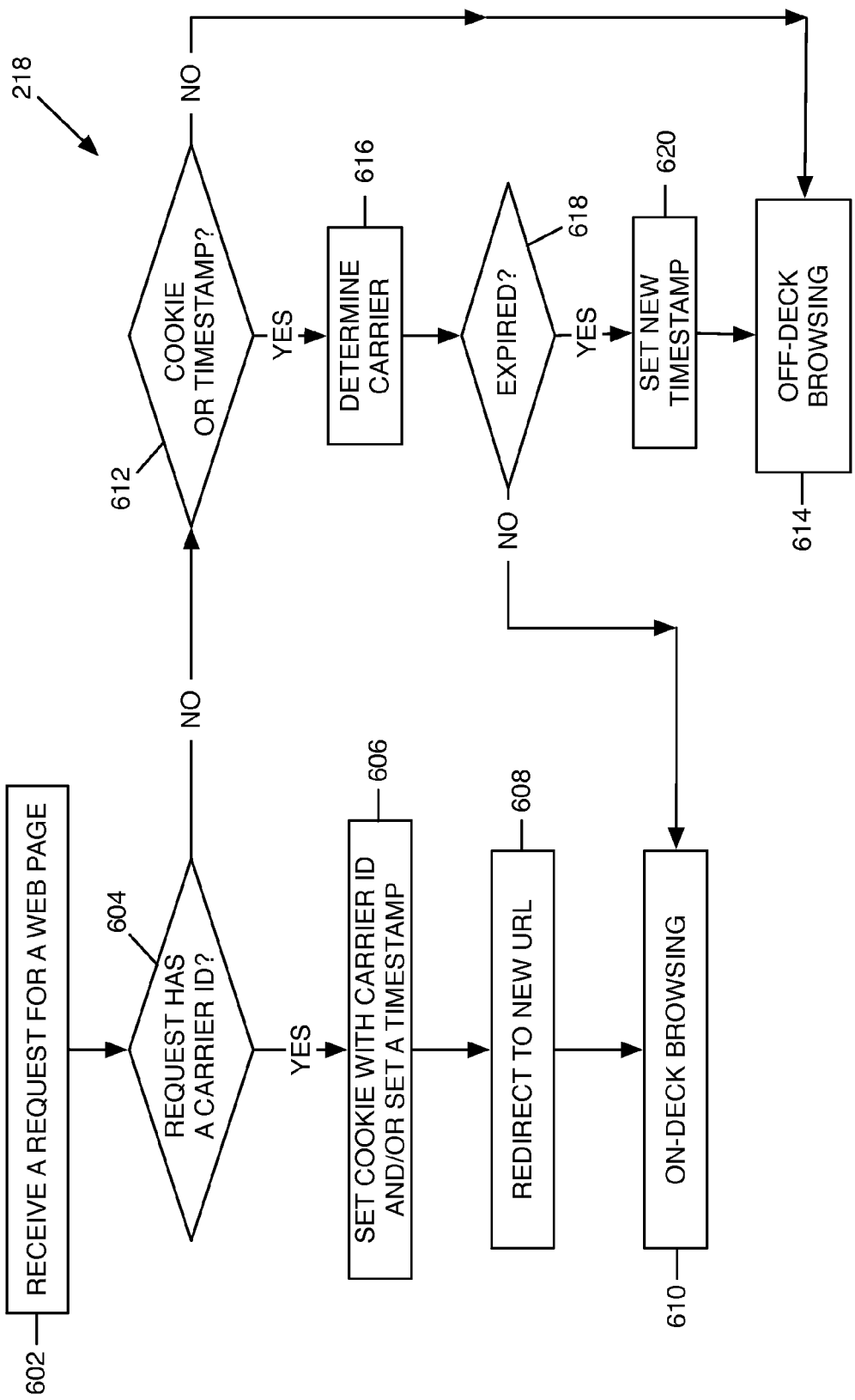
FIG. 6 is a flow chart illustrating the architecture, operation, and/or functionality of another possible embodiment of the on-deck detection system of FIG. 2.

FIG. 6 illustrates another implementation of the on-deck detection system 218 in which the secondary URL comprises a carrier ID or name. In this manner, each mobile carrier is assigned a unique secondary URL. At block 602, the on-deck detection system 218 receives a request for a web page and, at decision block 604, determines whether the request includes a carrier ID or name. If the request includes a carrier ID or name, the on-deck detection system 218 may use the carrier ID or name to determine that the request came via a carrier deck 208. At block 606, the on-deck detection system 218 sets a cookie with the carrier ID or name. For example, if the software on the mobile communication device 202 does not support cookies or if cookies are disabled, the on-deck detection system 218 may insert a timestamp into a new URL to which the device is redirected. In alternative embodiments where cookies or similar functionality are unavailable, the URL may be modified by, for example, modifying or appending the URL path or using other query string parameters (other than timestamps). Even if timestamps are used, it should be appreciated that it may be useful to capture other information, such as, the identification of the carrier. At block 608, the device is redirected to the new URL (either the timestamped URL, the primary URL, or alternate URL). At block 610, the on-deck detection system 218 provides an on-deck browsing session.

Referring back to decision block 604, if the request does not include a carrier ID or name, the on-deck detection system 218 may determine whether there is a cookie or timestamp, indicating that the device previously accessed the web site 204 as an on-deck user (decision block 612). If there is not a cookie or timestamp in the URL, the on-deck detection system 218 may treat the user as an off-deck user. Where a cookie or timestamp is detected, the on-deck detection system 218 may determine the identity of the mobile carrier (block 616) by reading the carrier ID or name or performing a database look-up based on the carrier ID or name. The remaining logic determines whether the prior on-deck user should be treated as an on-deck user or an off-deck user.

The on-deck detection system 218 may be configured with business rules or a timing feature that controls this logic. In an embodiment, this information may be stored in the cookie or provided via the timestamp in the URL redirect. For example, at decision block 618, the on-deck detection system 218 may determine whether the cookie or timestamp has expired or is no longer valid based on business logic. If the timestamp is current or the cookie is still valid, the user may be treated as an on-deck user (block 610). However, if the timestamp is expired or the cookie is no longer valid, the user may be treated as an off-deck user (block 614). Based on further business logic, at block 620, the on-deck detection system 218 may be configured to reset the cookie or the timestamp. FIGS. 7-12 illustrate various alternative embodiments of carrier-controlled user interfaces implemented on an exemplary mobile telephone 700 having a touch screen display device, which may be configured to support the on-deck detection system 218 and/or the on-deck/off-deck management system 220 (or other functionality) described above. The mobile telephone 700 includes a microphone 702 and various hardware keys, including, for example, a scroll button 704 for navigating a graphical user interface (GUI) displayed via the touch screen display device. The GUI may include a notification bar 706 for displaying system information or alerts, such as, signal strength icon 712, battery level icon 714, or any other relevant information. The notification bar 706 may be expandable downward based on touch input to display additional notification icons or alerts.

Figure 7:
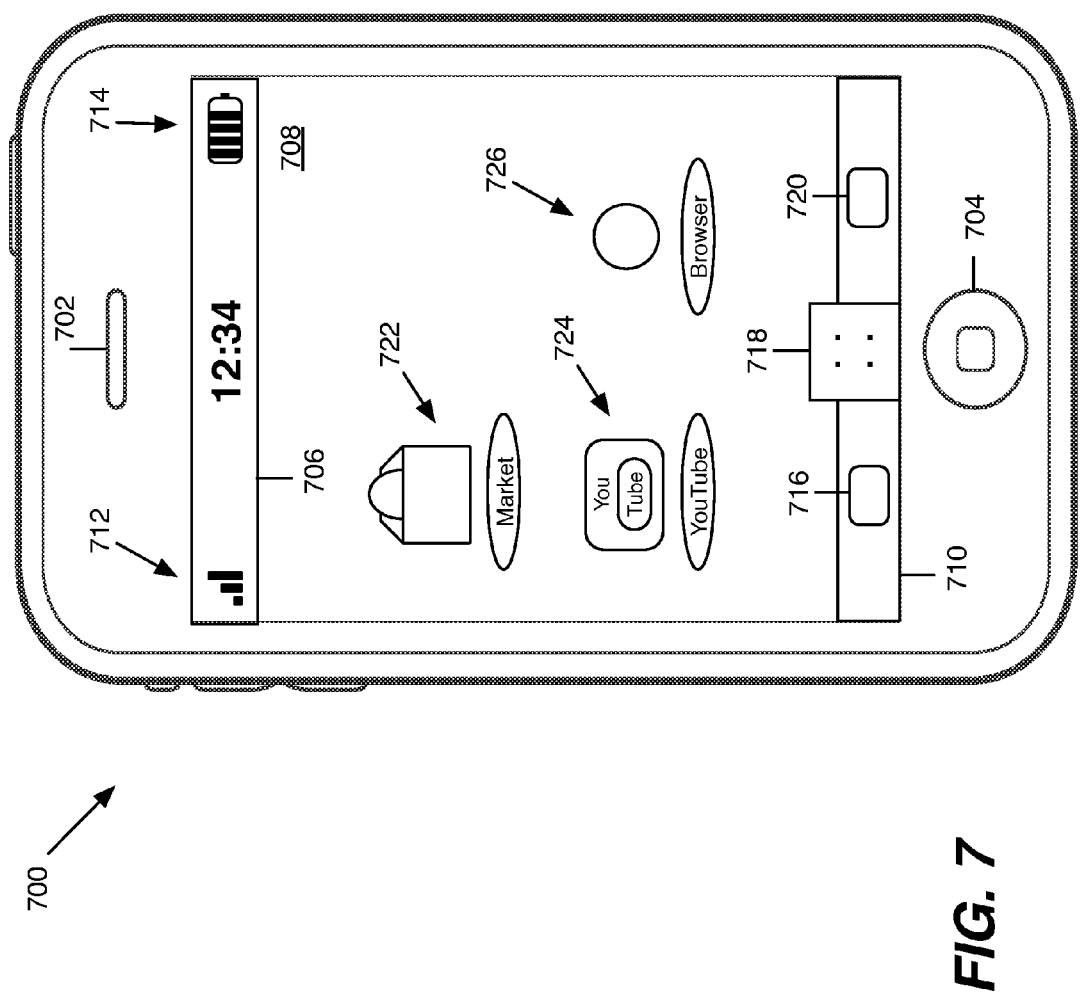
FIG. 7 is a screen shot of a mobile communication device illustrating an embodiment of a carrier-controlled user interface for requesting a web site.

As illustrated in FIG. 7, the GUI may provide a home screen 708 that displays a plurality of selectable icons associated with one or more applications stored on the mobile telephone 700. A Market icon 722 may launch an electronic app store 209 (FIG. 1) that enables users or subscribers to search, browse, view, purchase, download, and/or interact with third party applications, games, books, or other content provided by web server 206, carrier server 214, or any other suitable servers accessible via the Internet 216 and/or the carrier network 212. The electronic app store 209 may be managed, provided, or otherwise controlled by the carrier. In other embodiments, the electronic app store 209 may be managed and provided by a manufacturer of the mobile telephone 700, a software provider of the mobile operating system or other software, or any other third party having a business relationship with the carrier. Based on the terms of the business relationship, the carrier may have access to and, therefore, control one or more user interfaces associated with the electronic app store 209.

A browser icon 726 may launch browser 210 (FIG. 1), and other icons (e.g., YouTube icon 724) may launch third party or partner applications, web services, or otherwise initiate requests for the web site 204 (FIG. 1) to web server 206. For example, the browser 210 may be pre-configured with bookmarks to the secondary URL of the web site 204 (FIG. 4). Third party or partner applications or software (e.g., YouTube video sharing, Google search, Google maps, the electronic app store 209, etc.) may be configured to present links to the secondary URL (e.g., as advertisements, promoted content, etc.)

As further illustrated in FIG. 7, a screen portion 710 may display one or more soft buttons for launching further carrier-controlled applications, such as, a phone application button 716 and a short messaging service (SMS) application button 720 that may also display links to the web site 204 using the secondary URL. Furthermore, a menu button 720 may launch another embodiment of a carrier-controlled menu comprising applications stored on the mobile telephone 700.

Figure 11:
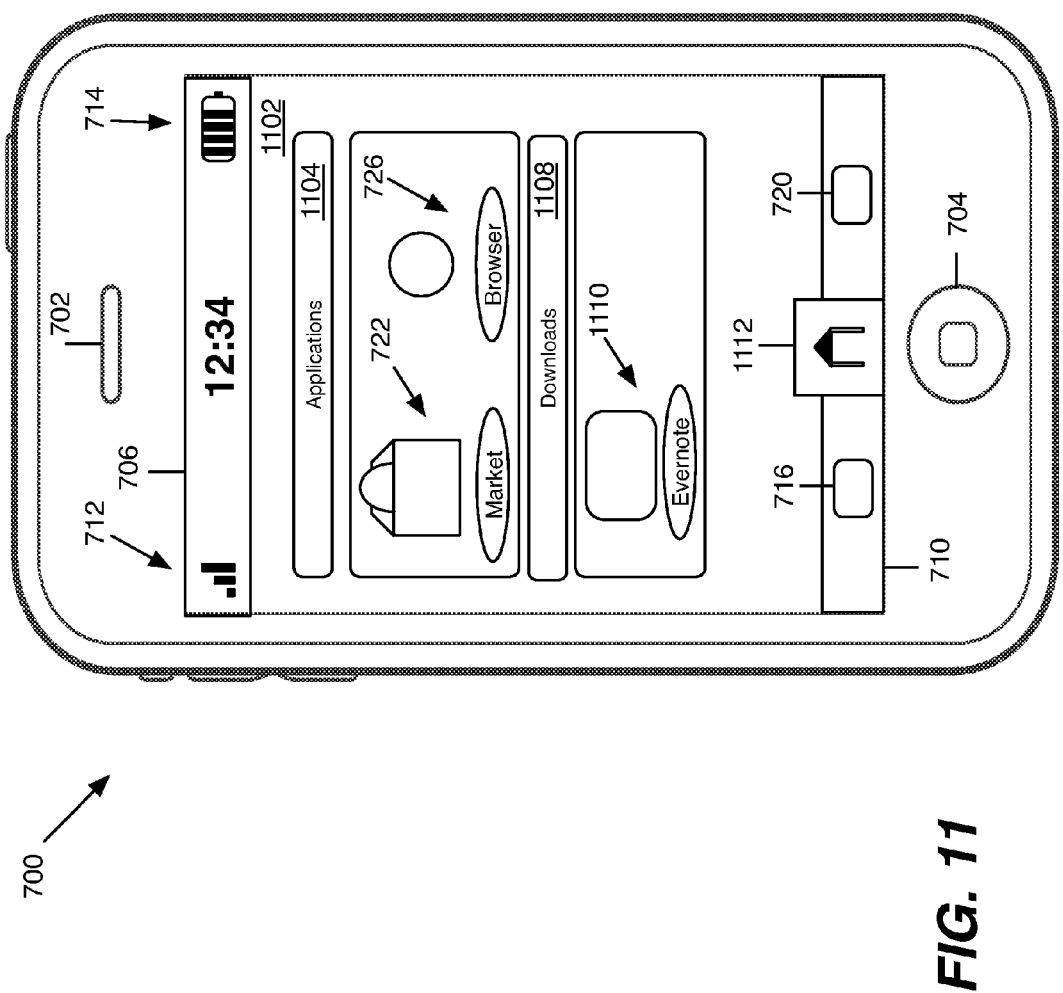
FIG. 11 illustrates a screen shot of an embodiment of a carrier-controlled applications menu for enabling subscribers to manage and launch third party applications.

FIG. 11 illustrates an exemplary menu 1102 that may be launched when a user selects the menu button 720. Menu 1102 may categorize the applications according to those applications that are pre-configured on the mobile telephone 700 by the carrier (i.e., an applications portion 1104) and those applications that are downloaded by the user from the electronic app store 209 (i.e., a downloads portion 1106). As illustrated in FIG. 11, when the menu 1102 is being displayed, the screen portion 710 may me modified to display a home button 1112 for navigating back to home screen 708 (FIG. 7) from menu 1102.

Figure 8:
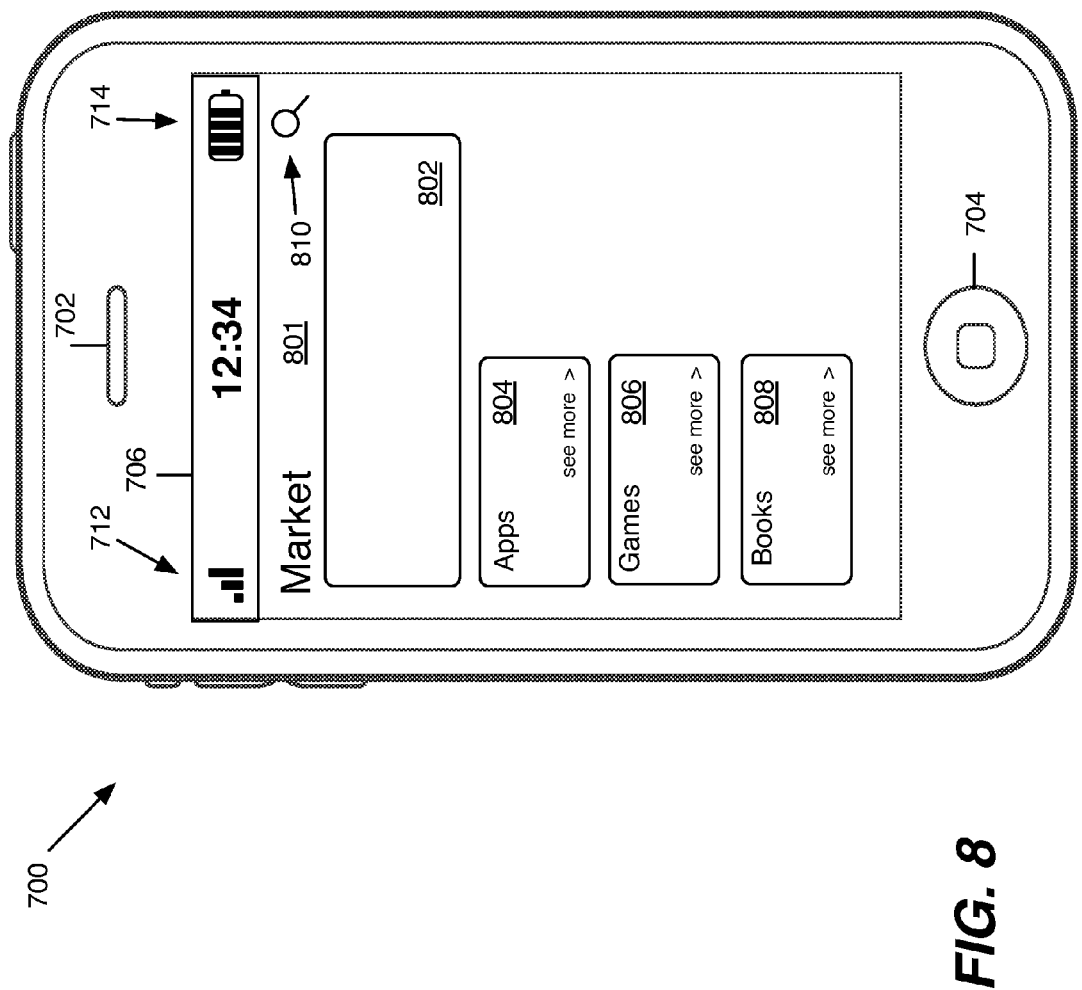
FIG. 8 illustrates a screen shot of an embodiment of a carrier-controlled electronic app store for downloading applications, games, and other content.

FIG. 8 illustrates a market screen 801 associated with the electronic app store 209. The market screen 801 may be displayed by selecting the Market icon 722 on home screen 708 (FIG. 7) or on menu 1102 (FIG. 11). A search button 801 may enable users to search for apps 211 in the electronic app store 209 by text input. Market screen 801 may comprise a promotional area 802 for highlighting one or more apps 211 or for displaying advertisements or other promotional content, any of which may be configured with links to the secondary URL for the web site 204. An "apps" area 804 may comprise a menu or link to apps 211, and a "games" area 806 and a "books" area 808 may comprise respective menus or links to other content available in the electronic app store 209.

Figure 9:
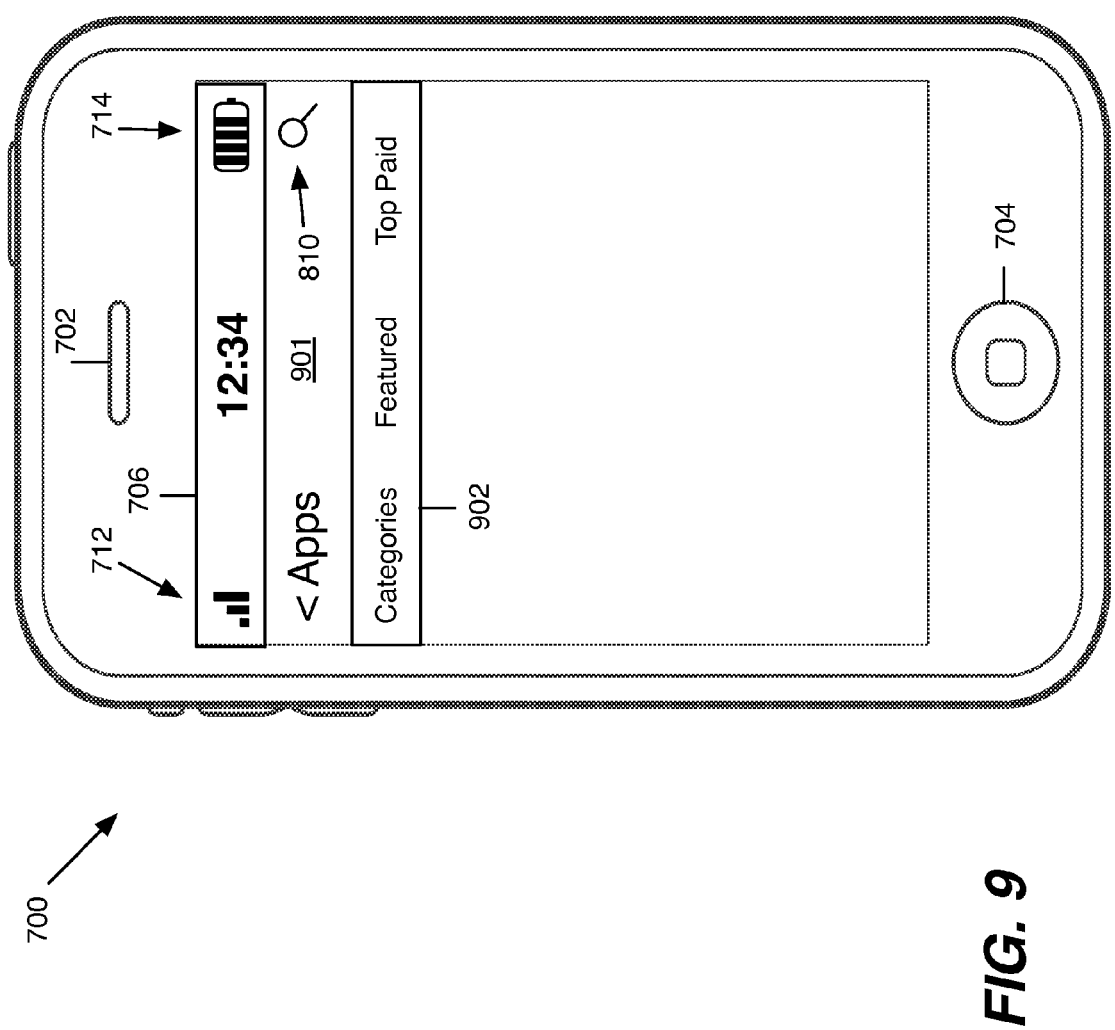
FIG. 9 illustrates a screen shot of an embodiment of an "apps" user interface supported by the carrier-controlled electronic app store for enabling subscribers to browse and search third party applications.
Figure 10:
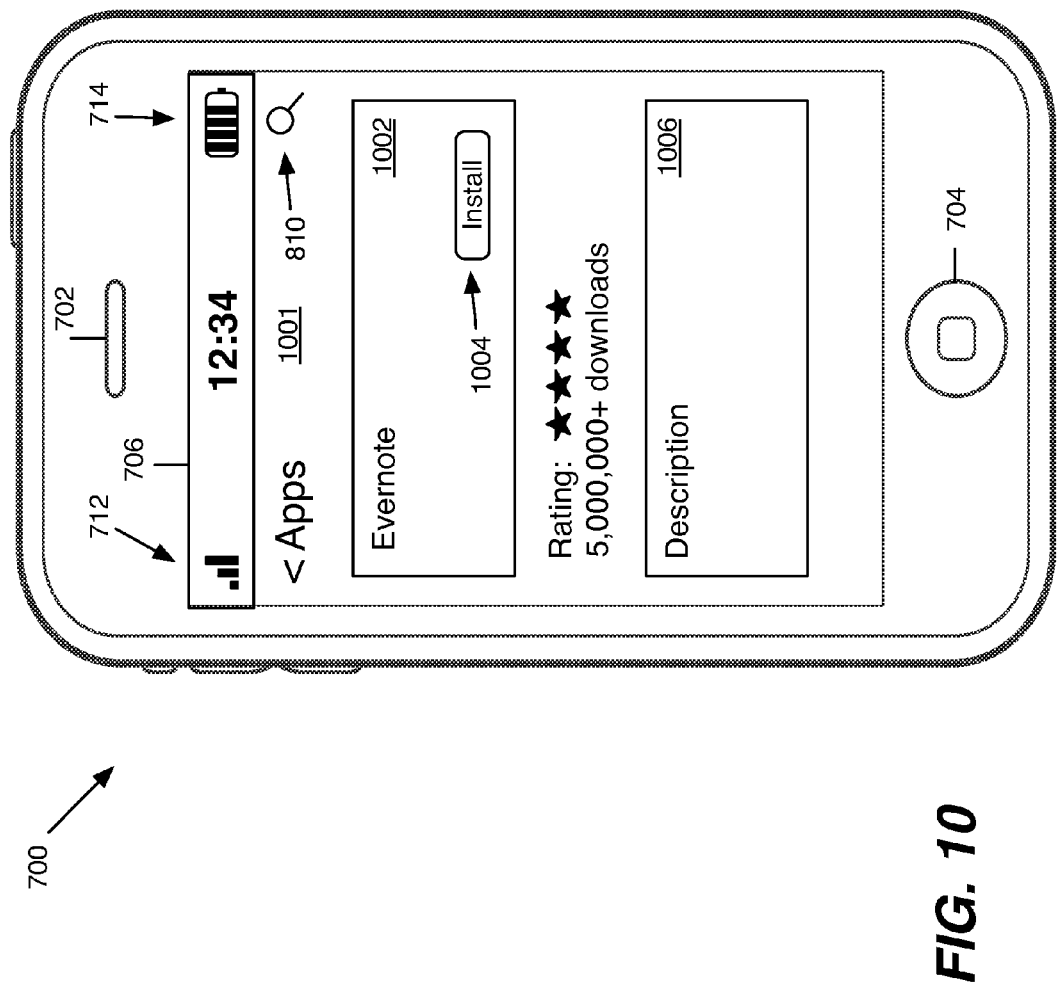
FIG. 10 illustrates a screen shot of an embodiment of a download/install user interface of an exemplary third party application.

FIG. 9 illustrates an "apps" screen 901 comprising an exemplary user interface for browsing or searching for apps 211. A user may search for apps 211 via search button 810 or browse based on categories, a featured apps list, or a top paid apps list. FIG. 10 illustrates an application screen 1001 for viewing the details of a particular app 211. The application screen 1001 may comprise a title portion 1002 including the name of the app 211 and an install button 1004 for downloading the app 211 to the mobile telephone 700. Other information about the app 211 may be displayed in a description portion 1006, including a user rating and the number of times the app 211 has been downloaded by users from the electronic app store 209. When an app 211 is downloaded to the mobile telephone 700, it may be added to the downloaded applications menu 1108 (FIG. 11).

Figure 12:
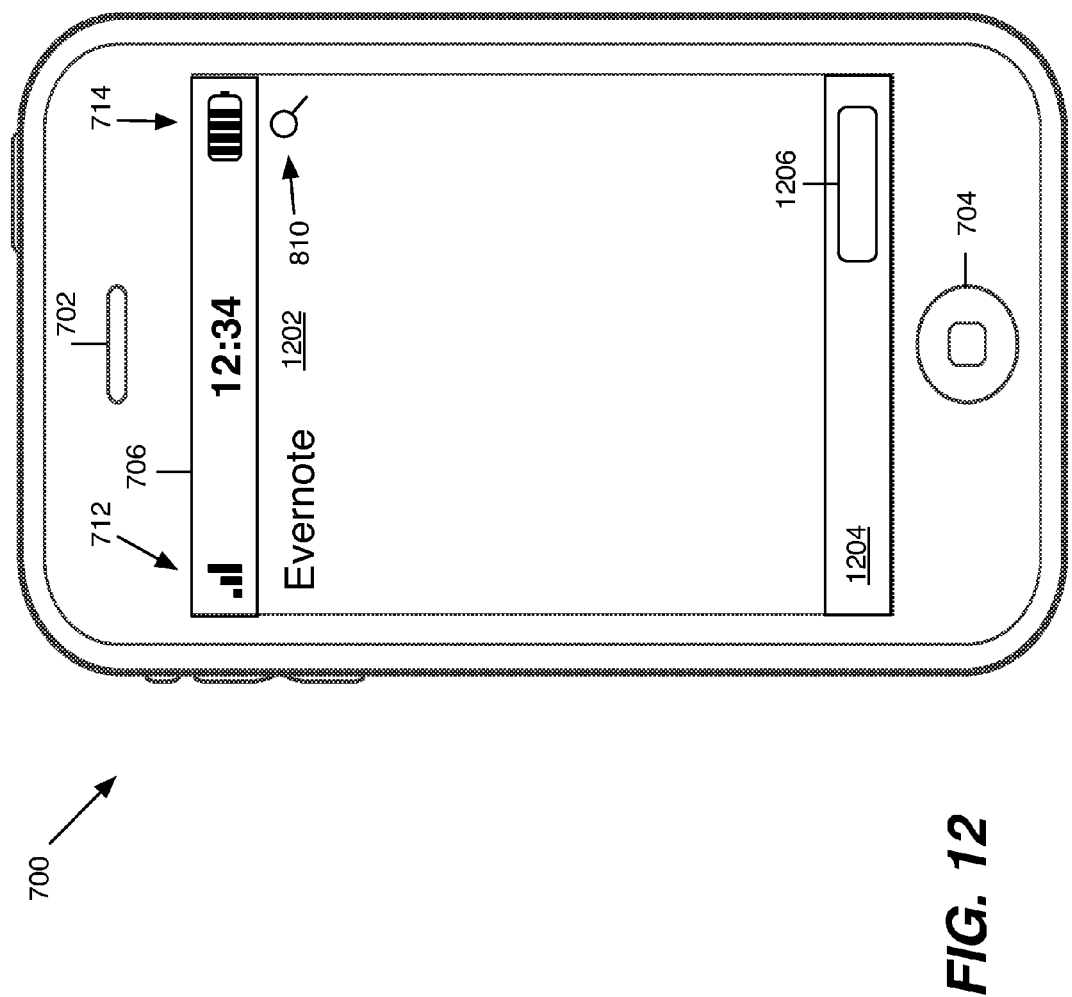
FIG. 12 illustrates a screen shot of an embodiment of a user interface of an exemplary third party application, which displays in-app advertisements containing links for requesting a web site.

FIG. 12 illustrates an application screen 1202 comprising a user interface for displaying the content and/or functionality associated with a particular app 211. The application screen 1202 may include an advertisement portion 1204 for displaying "in-app" advertisements 1206. The advertisements 1206 may provide another mechanism for displaying links associated with the secondary URL, as described above. The in-app links may be generated by an advertisement program at least partially controlled by the carrier or an agent, affiliate, partner, etc. of the carrier.

One of ordinary skill in the art will appreciate that the process descriptions or blocks associated with the flow charts may represent modules, segments, logic or portions of code which include one or more executable instructions for implementing logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, the on-deck detection system 218 and the on-deck/off-deck management system 220 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method to minimize a number of requests to a web site from a mobile communication device fulfilled using on-deck browsing sessions, the method comprising:
   providing a user interface on the mobile communication device, the user interface including a first link to a web site of an associated content provider, the first link specifying a first URL to the web site, wherein the user interface is provided by a first carrier, of a plurality of carriers;
   receiving a first request for the web site from the mobile communication device, wherein the first request specifies the first URL;
   upon determining that the first request originated from the user interface and specifies the first URL:
      accessing carrier-specific data specifying, for the first carrier, a mapping between the first URL and a second URL to the web site;
      redirecting the first request to the second URL; and
      presenting the web site to the mobile communication device in an on-deck browsing session consistent with terms of a relationship between the first carrier and the associated content provider;
   after the on-deck browsing session, receiving a second request for the web site from the mobile communication device, wherein the second request specifies the second URL; and
   upon determining that the second request originated from a source other than the user interface and specifies the second URL, presenting the web site to the mobile communication device in an off-deck browsing session without regard to the terms of the relationship between the first carrier and the associated content provider to reduce the number of on-deck browsing sessions.

2. The method of claim 1, wherein the first URL further specifies a carrier identifier for the first carrier, wherein the carrier-specific data further specifies: (i) carrier identifiers, and (ii) mappings for each of the plurality of carriers.

3. The method of claim 2, wherein determining that the first request originated from the user interface further comprises identifying the carrier identifier for the first carrier in the first URL.

4. The method of claim 3, wherein the on-deck browsing session is presented according to a presentation scheme associated with the first carrier.

5. The method of claim 4, wherein presenting the web site to the mobile communication device in the off-deck browsing session comprises presenting the web site according to a different presentation scheme.

6. The method of claim 5, further comprising providing a cookie to the mobile communication device during the first browsing session, and wherein determining that the second request originated from the source other than the user interface comprises identifying the cookie.

7. The method of claim 6, wherein the user interface comprises one of a menu associated with an electronic app store, an in-app advertisement, and a carrier deck.

8. A system for providing a web site to mobile communication devices, the system comprising:
   one or more computer processors; and
   a memory containing a program, which when executed by the one or more computer processors, performs an operation to minimize a number of requests to a web site from a mobile communication device fulfilled using on-deck browsing sessions, the operation comprising:
      providing a user interface on the mobile communication device, the user interface including a first link to a web site of an associated content provider, the first link specifying a first URL to the web site, wherein the user interface is provided by a first carrier, of a plurality of carriers;
      receiving a first request for the web site from the mobile communication device, wherein the first request specifies the first URL;
      upon determining that the first request originated from the user interface and specifies the first URL:
         accessing carrier-specific data specifying, for the first carrier, a mapping between the first URL and a second URL to the web site;
         redirecting the first request to the second URL; and
         presenting the web site to the mobile communication device in an on-deck browsing session consistent with terms of a relationship between the first carrier and the associated content provider;
      receiving, after the on-deck browsing session, a second request for the web site from the mobile communication device, wherein the second request specifies the second URL; and
      upon determining that the second request originated from a source other than the user interface and specifies the second URL, presenting the web site to the mobile communication device in an off-deck browsing session provider to reduce the number of on-deck browsing session, wherein the web site is presented with a different presentation scheme.

9. The system of claim 8, wherein the second request is initiated by the mobile communication device from one or more of a browser, a bookmark, a user input, and a search engine results page.

10. The system of claim 9, wherein the first URL further specifies a carrier identifier for the first carrier, wherein the carrier-specific data further specifies: (i) carrier identifiers, and (ii) mappings for each of the plurality of carriers.

11. The system of claim 10, wherein the user interface comprises one of a carrier deck, an electronic app store, and an in-app link in an app downloaded from the electronic app store.

12. A computer program embodied in a non-transitory computer-readable medium to minimize a number of requests to a web site from a mobile communication device fulfilled using on-deck browsing sessions, the computer program comprising:
 providing a user interface on the mobile communication device, the user interface including a first link to a web site of an associated content provider, the first link specifying a first URL to the web site, wherein the user interface is provided by a first carrier, of a plurality of carriers;
 receiving a first request for a web site from the mobile communication device, wherein the first request specifies the first URL;
 upon determining that the first request originated from the user interface and specifies the first URL:
  accessing carrier-specific data specifying, for the first carrier, a mapping between the first URL and a second URL to the web site;
  redirecting the first request to the second URL; and
  presenting the web site as an on-deck browsing session;
 receiving, after the first request, a second request for the web site from the mobile communication device, wherein the second request is initiated from a source other than the carrier-controlled user interface and specifies the second URL; and
 upon determining that the second request originated from the source other than the user interface and specifies the second URL, presenting the web site to the mobile communication device in an off-deck browsing session without regard to the terms of the relationship between the first carrier and the associated content provider to reduce the number of on-deck browsing sessions.

13. The computer program of claim 12, wherein the second request is initiated by the mobile communication device from one or more of a browser, a bookmark, a user input, and a search engine results page.

14. The computer program of claim 13, wherein the first URL further specifies a carrier identifier for the first carrier, wherein the carrier-specific data further specifies: (i) carrier identifiers, and (ii) mappings for each of the plurality of carriers.

15. The computer program of claim 14, wherein the user interface comprises one of a carrier deck, an electronic app store, and an app provided via the electronic app store, and wherein the user interface further comprises providing a cookie to the mobile communication device during the on-deck browsing session, and wherein determining that the second request originated from the source other than the user interface comprises identifying the cookie.

* * * * *